(12) United States Patent
He et al.

(10) Patent No.: US 9,509,973 B2
(45) Date of Patent: Nov. 29, 2016

(54) METHOD AND DEVICE FOR COMPRESSING VERTEX DATA IN THREE-DIMENSIONAL IMAGE DATA

(75) Inventors: Feifei He, Shenzhen (CN); Jian Hui, Shenzhen (CN); Gengmao Sun, Shenzhen (CN); Feng Gao, Shenzhen (CN); Zhibin Pan, Shenzhen (CN); Da Li, Shenzhen (CN); Jingyuan Li, Shenzhen (CN)

(73) Assignee: ZTE Corporation, Shenzhen, Guangdong (CN)

( * ) Notice: Subject to any disclaimer, the term of this patent is extended or adjusted under 35 U.S.C. 154(b) by 375 days.

(21) Appl. No.: 14/372,901

(22) PCT Filed: Apr. 12, 2012

(86) PCT No.: PCT/CN2012/073932
§ 371 (c)(1),
(2), (4) Date: Jul. 17, 2014

(87) PCT Pub. No.: WO2013/123701
PCT Pub. Date: Aug. 29, 2013

(65) Prior Publication Data
US 2014/0362182 A1    Dec. 11, 2014

(30) Foreign Application Priority Data
Feb. 23, 2012  (CN) .......................... 2012 1 0042419

(51) Int. Cl.
*H04N 13/00* (2006.01)
*G06T 9/00* (2006.01)
*H04N 19/94* (2014.01)

(52) U.S. Cl.
CPC ........... *H04N 13/0048* (2013.01); *G06T 9/001* (2013.01); *G06T 9/008* (2013.01); *H04N 19/94* (2014.11)

(58) Field of Classification Search
CPC .. H04N 13/0048; H04N 19/94; G06T 9/001; G06T 9/008
USPC ........................................................ 348/43
See application file for complete search history.

(56) References Cited

U.S. PATENT DOCUMENTS 6,256,041 B1   7/2001 Deering
2010/0284392 A1* 11/2010 Sato ...................... G10L 19/038
                                                                 370/342

(Continued)

FOREIGN PATENT DOCUMENTS

CN       1946180 A     4/2007
CN     101944358 A     1/2011

(Continued)

OTHER PUBLICATIONS

Nguyen H et al: "Concentric-Shell Partition Vector Quantization with Application to Image Coding", IEEE Transactions on Communications, IEEE Service Center, Piscataway, NJ, USA, vol. 42, No. 2/03/04, Feb. 1, 1994 (Feb. 1, 1994), pp. 1911-1918, XP000447404,ISSN: 0090-6778, DOI: 10.1109/TC0MM.1994.582901,mailed on Feb. 1, 1994.
McNames J: "Rotated partial distance search for faster vector quantization encoding",IEEE Signal Processing Letters, IEEE Service Center, Piscataway, NJ, US, vol. 7, No. 9, Sep. 1, 2000 (Sep. 1, 2000), pp. 244-246, XP011428310,ISSN: 1070-9908, DOI: 10.1109/97.863145,mailed on Sep. 1, 2000.

(Continued)

*Primary Examiner* — Allen Wong
(74) *Attorney, Agent, or Firm* — Oppedahl Patent Law Firm LLC

(57) ABSTRACT

A device for compressing vertex data in three-dimensional (3D) image data includes a codebook design module and a codeword search module. The codebook design module is configured for: grouping residual vectors of vertices in 3D image data for codebook design; generating, for each group of residual vectors, a sub-codebook formed by a specified number of codewords; and sending the generated sub-codebook corresponding to a group of residual vectors to the codeword search module. The codeword search module is configured for: receiving a sub-codebook sent by the codebook design module; searching for a codeword of optimal match of a to-be-compressed residual vector of a vertex in 3D image data to be compressed; and taking an index of the codeword of optimal match and an index of a sub-codebook where the codeword of optimal match is located as compressed data of the vertex. A method for compressing vertex data in 3D image data is further disclosed. With the disclosure, it is possible to save codeword storage space, enhance encoding quality, improve a compression ratio of vertex data, and increase a compression efficiency.

12 Claims, 2 Drawing Sheets

(56) References Cited

U.S. PATENT DOCUMENTS

| | | |
|---|---|---|
| 2011/0046923 A1 | 2/2011 | Lee |
| 2012/0075302 A1 | 3/2012 | Cai |
| 2012/0189220 A1* | 7/2012 | Ahn ........................ G06T 9/001 382/238 |

FOREIGN PATENT DOCUMENTS

| | | |
|---|---|---|
| EP | 2261859 A1 | 12/2010 |
| JP | 2002049933 A | 2/2002 |
| KR | 1999002045 A | 1/1999 |
| KR | 20030054606 A | 7/2003 |
| KR | 100598134 B1 | 7/2006 |
| WO | 2009128617 A2 | 10/2009 |

OTHER PUBLICATIONS

In: Gersho A et al: "Vector Quantization and Signal Compression",1991, Kluwer, XP0Q2065452, pp. 423-424,mailed on 1991.

Z. Li et al: "Fast codevector search scheme for 3D mesh model vector quantisation",Electronics Letters, vol. 44, No. 2, Jan. 1, 2008 (Jan. 1, 2008), pp. 104-105, XP055272845,GB ISSN: 0013-5194, DOI: 10.1049/el:20O82270,mailed on Jan. 1, 2008.

Supplementary European Search Report in European application No. 12869069.0, mailed on May 31, 2016.

International Search Report in international application No. PCT/CN2012/073932, mailed on Nov. 29, 2012.

English Translation of the Written Opinion of the International Search Authority in international application No. PCT/CN2012/073932, mailed on Nov. 29, 2012.

Vertex Data Compression for Triangular Meshes, Oct. 5, 2000.

A Coding Algorithm Using PCA-Based Correlation Vector Quantization, Aug. 2005.

Vector quantization technology and applications and parallel algorithm design, Sep. 2003.

Fast Planar-Oriented Ripple Search Algorithm for Hyperspace VQ Codebook, Jun. 2007.

* cited by examiner

METHOD AND DEVICE FOR COMPRESSING VERTEX DATA IN THREE-DIMENSIONAL IMAGE DATA

TECHNICAL FIELD

The disclosure relates to data compression technology in the field of three-dimensional (3D) image processing, and more particularly to a method and device for compressing vertex data in 3D image data.

BACKGROUND

With the development of image processing technology, data processing of more lifelike 3D images have gradually become a hotspot. As important technology in 3D image data processing, 3D image data compression includes vertex connection data compression and vertex data compression. With an existing method for vertex connection data compression, it is possible to achieve an efficiency in vertex connection data compression approaching a theoretical limit. A method for compressing vertex data in 3D image data has therefore become an efficiency-determining factor in 3D image data compression.

An existing method for compressing vertex data includes steps as follows. A compression codebook is generated; a residual vector of each vertex in 3D image data to be compressed is calculated and taken as a residual vector to be encoded; a preset compression codebook is searched for a codeword of optimal match of each residual vector to be encoded, and an index of the found codeword of optimal match is taken as compressed data of the vertex; compressed data of any remaining vertex are obtained by repeating the search step for a codeword of optimal match of the residual vector of the vertex.

A method for generating a compression codebook includes steps as follows. 3D image data for generating a compression codebook are selected; a residual vector of each vertex in the selected 3D image data is calculated using a parallelogram prediction algorithm; the compression codebook is obtained as a set of codewords resulted from training a modulus of the residual vector of each vertex data using an LBG algorithm. However, this method fails to taken into full consideration characteristics in distribution of moduli of residual vectors in 3D image data, namely, the fact that there are more residual vectors having small moduli with minimal difference between each other. A compression codebook generated as such therefore includes large amounts of codewords with very small Euclidean distances, thereby leading to waste of storage space. For example, assuming that a compression codebook finally obtained is formed by one hundred codewords $\{x_1,y_1,z_1; x_2,y_2,z_2; \ldots; x_{100},y_{100},z_{100}\}$, eighty of which have residual vectors with moduli range from 0 to 150, with very small Euclidean distances among the eighty compression codes; therefore more storage space will be used to store a lot of similar codewords. Moreover, as only a small part of the compression codebook is used to represent vertex data with residual vectors of large moduli, image quality cannot be improved.

In addition, in the aforementioned method for compressing vertex data, a compression codebook is searched with a Full Search (FS) method by: traversing all codewords in the compression codebook to calculate the Euclidean distance between each codeword and a residual vector to be encoded; taking a codeword with a minimal Euclidean distance to the residual vector as a codeword of optimal match of the residual vector; and taking an index of the codeword of optimal match as compressed data of the vertex. However, as a preset compression codebook includes a lot of codewords with small Euclidean distances between each other, a lot of time will be spent traversing a lot of similar codewords and calculating similar Euclidean distances, thus affecting efficiency in compressing the vertex data. Moreover, the large number of similar codewords will lead to an increased number of codeword indices and therefore to an increased number of bits for codeword indices, such that a compression ratio of the vertex data (a bit ratio of compressed data of the vertex to the residual vector of the vertex) cannot be improved.

It can be seen that without fully utilizing characteristics in distribution of vertex data in 3D image data, the existing method for compressing vertex data fails to save codeword storage space, enhance encoding quality and improve a compression ratio of vertex data, thereby affecting a compression efficiency.

SUMMARY

In view of this, the disclosure provides a method and device for compressing vertex data in 3D image data, capable of saving codeword storage space, enhancing encoding quality, improving a compression ratio of vertex data and increasing a compression efficiency.

To this end, a technical solution of an embodiment of the disclosure is implemented as follows.

A device for compressing vertex data in three-dimensional (3D) image data, including a codebook design module and a codeword search module, wherein the codebook design module is configured for: grouping residual vectors of vertices in 3D image data for codebook design; generating, for each group of residual vectors, a sub-codebook formed by a specified number of codewords; and sending the generated sub-codebook corresponding to a group of residual vectors to the codeword search module; and the codeword search module is configured for: receiving a sub-codebook sent by the codebook design module; searching for a codeword of optimal match of a to-be-compressed residual vector of a vertex in 3D image data to be compressed; and taking an index of the codeword of optimal match and an index of a sub-codebook where the codeword of optimal match is located as compressed data of the vertex.

In an embodiment, the device may further include a residual vector calculating module configured for: calculating residual vectors of vertices in the 3D image data for codebook design, and sending the calculated residual vectors to the codebook design module, wherein the codebook design module may be configured for: receiving the residual vectors of the vertices in the 3D image data for codebook design sent by the residual vector calculating module; sorting the received residual vectors in an ascending order of moduli of the received residual vectors; consecutively extracting a number of residual vectors from the sorted residual vectors to form a group of residual vectors according to a group number and grouping proportions; recording a moduli range of the formed group of residual vectors; obtaining a number (which is equal to the group number) of groups of residual vectors by repeating the extraction step; and numbering each of the obtained groups of residual vectors in an order in which the groups of residual vectors are obtained.

In an embodiment, the codebook design module may be configured for: extracting the groups of residual vectors group by group; generating a specified number of codewords by training an extracted group of residual vectors using an LBG algorithm; and forming, by the specified number of codewords generated, a sub-codebook corresponding to the extracted group of residual vectors.

In an embodiment, the residual vector calculating module may be further configured for calculating a to-be-compressed residual vector of a vertex in the 3D image data to be compressed, and sending the calculated to-be-compressed residual vector to the codeword search module; and the codeword search module may be configured for: receiving a to-be-compressed residual vector of a vertex in the 3D image data to be compressed sent by the residual vector calculating module; determining a group of residual vectors of which a modulus of the received to-be-compressed residual vector falls into the moduli range; and searching a sub-codebook corresponding to the determined group of residual vectors for a codeword of optimal match of the received to-be-compressed residual vector.

In an embodiment, the device may further include a control module configured for selecting a codeword search method of a Full Search (FS) method or a quick search method, and sending the codeword search module a notification of a selected codeword search method, wherein the codeword search module may be further configured for receiving the notification of the selected codeword search method sent by the control module.

In an embodiment, the codeword search module may be configured for: when the quick search method is selected, calculating an orthogonal transformation matrix of a sub-codebook using a Principal Component Analysis (PCA) algorithm; performing an orthogonal transformation on each codeword in the sub-codebook using the orthogonal transformation matrix of the sub-codebook; and storing the codeword subject to the orthogonal transformation as a new codeword in the sub-codebook; and in codeword search, determining a group of residual vectors of which a modulus of a to-be-compressed residual vector falls into a moduli range, and determining a sub-codebook corresponding to the determined group of residual vectors and the to-be-compressed residual vector; performing orthogonal transformation on the to-be-compressed residual vector using an orthogonal transformation matrix of the determined sub-codebook; and searching codewords subject to orthogonal transformation in the determined sub-codebook for a codeword of optimal match of the transformed to-be-compressed residual vector.

The disclosure further provides a method for compressing vertex data in three-dimensional (3D) image data, including steps of:

grouping residual vectors of vertices in 3D image data for codebook design; and generating, for each group of residual vectors, a sub-codebook formed by a specified number of codewords; and searching for a codeword of optimal match of a to-be-compressed residual vector of a vertex in 3D image data to be compressed; and taking an index of the codeword of optimal match and an index of a sub-codebook where the codeword of optimal match is located as compressed data of the vertex.

In an embodiment, the step of grouping residual vectors of vertices in 3D image data for codebook design may include:

calculating residual vectors of vertices in the 3D image data for codebook design; and sorting the calculated residual vectors of the vertices in the 3D image data for codebook design in an ascending order of moduli; consecutively extracting a number of residual vectors from the sorted residual vectors to form a group of residual vectors according to a group number and grouping proportions; recording a moduli range of the formed group of residual vectors; obtaining a number (which is equal to the group number) of groups of residual vectors by repeating the extraction step; and numbering each of the obtained groups of residual vectors in an order in which the groups of residual vectors are obtained.

In an embodiment, the step of generating, for each group of residual vectors, a sub-codebook formed by a specified number of codewords may include:

extracting groups of residual vectors group by group; generating a specified number of codewords by training an extracted group of residual vectors using an LBG algorithm; and forming, by the specified number of codewords generated, a sub-codebook corresponding to the extracted group of residual vectors.

In an embodiment, the step of searching for a codeword of optimal match of a to-be-compressed residual vector of a vertex in 3D image data to be compressed may include:

calculating the to-be-compressed residual vector of the vertex in the 3D image data to be compressed; and determining a group of residual vectors of which a modulus of the to-be-compressed residual vector falls into a moduli range; and searching a sub-codebook corresponding to the determined group of residual vectors for a codeword of optimal match of the to-be-compressed residual vector.

In an embodiment, the sub-codebook corresponding to the determined group of residual vectors may be searched for the codeword of optimal match using a Full Search (FS) method or a quick search method.

In an embodiment, when the quick search method is used, the step of searching a sub-codebook corresponding to the determined group of residual vectors for a codeword of optimal match may include:

calculating an orthogonal transformation matrix of a sub-codebook using a Principal Component Analysis (PCA) algorithm; performing an orthogonal transformation on each codeword in the sub-codebook using the orthogonal transformation matrix of the sub-codebook; and storing the codeword subject to the orthogonal transformation as a new codeword in the sub-codebook; and in codeword search, determining the group of residual vectors of which the modulus of the to-be-compressed residual vector falls into the moduli range, and determining the sub-codebook corresponding to the determined group of residual vectors and the to-be-compressed residual vector; performing orthogonal transformation on the to-be-compressed residual vector using an orthogonal transformation matrix of the determined sub-codebook; and searching codewords subject to orthogonal transformation in the determined sub-codebook for a codeword of optimal match of the transformed to-be-compressed residual vector.

With the method and device for compressing vertex data in 3D image data according to the disclosure, residual vectors for generating a compression codebook are divided into groups of residual vectors; for each group, a sub-codebook corresponding to the group of residual vectors is generated; a number of codewords in each sub-codebook is specified. It is possible to specify, according to characteristics in distribution of residual vectors of vertices in 3D image data, namely, the fact that the number of residual vectors decreases with an increasing residual vector modulus, fewer codewords for a sub-codebook corresponding to a group of residual vectors with smaller moduli, reducing a total number of codewords in the compression codebook without affecting final compressed data, thereby saving codeword storage space; and specify more codewords for a sub-codebook corresponding to a group of residual vectors with larger moduli, increasing a number of codewords for representing residual vectors with larger moduli, thus improving quality in encoding.

In addition, in codeword search, as a codeword of optimal match of a to-be-compressed residual vector is selected from a sub-codebook corresponding to the the to-be-compressed residual vector, and when a frequently used sub-codebook corresponding to a group of residual vectors with small moduli is generated, fewer codewords are specified for the sub-codebook, time spent searching the frequently used sub-codebook may be reduced; and as a sub-codebook corresponding to a group of residual vectors with large moduli is seldom used, there will barely any impact on search time due to increase in the number of codewords for the part of residual vectors with large moduli. Thus, overall compression efficiency is improved.

Moreover, by reducing the number of codewords and grouping the codewords, a number of bits of indices of sub-codebooks and of codewords corresponding to final compressed data is reduced, thereby improving compression ratio of vertex data.

DETAILED DESCRIPTION

In embodiments of the disclosure, residual vectors of vertices in 3D image data for codebook design are grouped; and a sub-codebook formed by a specified number of codeword is generated for each group of residual vectors; search is performed for a codeword of optimal match of a to-be-compressed residual vector of a vertex in 3D image data to be compressed; and an index of the codeword of optimal match and an index of a sub-codebook where the codeword of optimal match is located are taken as compressed data of the vertex.

The disclosure is further elaborated below with reference to the drawings and specific embodiments.

Figure 1:
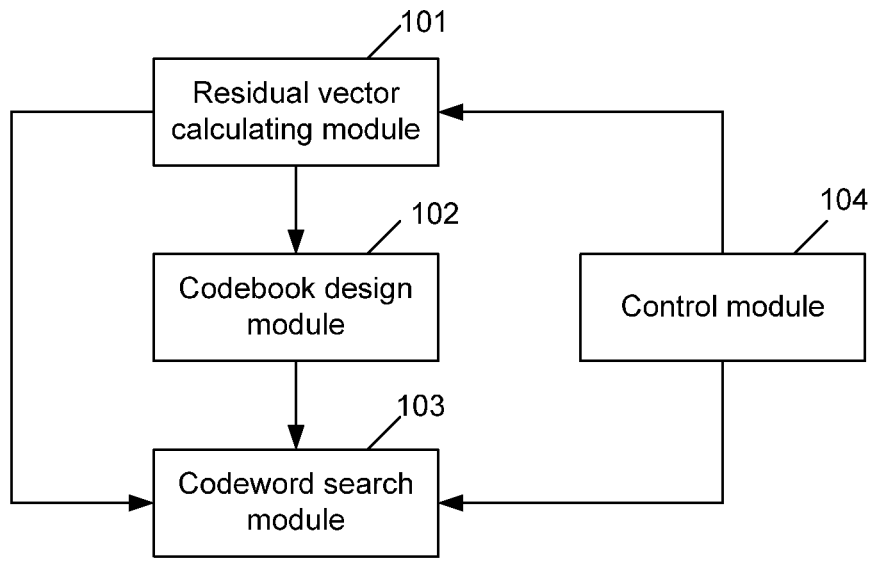
FIG. 1 is a schematic diagram of a structure of a device for compressing vertex data in 3D image data according to the disclosure.

A device for compressing vertex data in 3D image data provided by the disclosure is as shown in FIG. 1. The device includes a codebook design module 102 and a codeword search module 103.

The codebook design module 102 is configured for: grouping residual vectors of vertices in 3D image data for codebook design; generating, for each group of residual vectors, a sub-codebook formed by a specified number of codewords; and sending the generated sub-codebook corresponding to a group of residual vectors to the codeword search module 103; and the codeword search module 103 is configured for: receiving a sub-codebook sent by the codebook design module 102; searching a sub-codebook corresponding to a to-be-compressed residual vector of a vertex in 3D image data to be compressed for a codeword of optimal match of the to-be-compressed residual vector; and taking an index of the codeword of optimal match and an index of the sub-codebook where the codeword of optimal match is located as compressed data of the vertex.

The device may further include a control module 104 and a residual vector calculating module 101.

The control module 104 may be configured for: setting an operation state of the device; and when the operation state is sub-codebook generation, sending the 3D image data for codebook design to the residual vector calculating module 101, and sending the residual vector calculating module 101 a notification to send residual vectors of vertices in the 3D image data for codebook design to the codebook design module 102.

The residual vector calculating module 101 may be configured for: receiving the 3D image data for codebook design sent by the control module 104, calculating residual vectors of vertices in the 3D image data for codebook design using a parallelogram prediction algorithm, and sending the calculated residual vectors to the codebook design module 102 according to the notification sent by the control module 104.

Correspondingly, the codebook design module 102 may be further configured for receiving the residual vectors of the vertices in the 3D image data for codebook design sent by the residual vector calculating module 101.

The 3D image data for codebook design may be 3D image data for generating a compression codebook which are selected by a user as needed.

The codebook design module 102 may be specifically configured for: sorting the received residual vectors of the vertices in the 3D image data for codebook design in an ascending order of moduli of the received residual vectors; consecutively extracting a number of residual vectors from the sorted residual vectors to form a group of residual vectors according to grouping proportions and a group number preset; recording a moduli range of the formed group of residual vectors; obtaining a number (which is equal to the group number) of groups of residual vectors by repeating the extraction step; and numbering each of the obtained groups of residual vectors in an order in which the groups of residual vectors are obtained.

The group number is preset as needed. A grouping proportion is a ratio of a number of residual vectors in a group of residual vectors to a total number of the sorted residual vectors of the vertices in the 3D image data for codebook design (codebook-design residual vectors, hereinafter) set as needed. Moduli ranges may be calculated according to the grouping proportions.

For example, assume that the group number is preset as three, with grouping proportions of 85%, 10% and 5%; three groups of residual vectors are formed by three numbers of residual vectors consecutively extracted from the list of codebook-design residual vectors sorted in an ascending order of moduli, where the three numbers corresponding respectively to the grouping proportions of 85%, 10% and 5%, and residual vector moduli corresponding to the grouping proportions 85%, 10% and 5% are record respectively as moduli ranges of the three groups of residual vectors.

The codebook design module 102 may be specifically configured for: extracting the groups of residual vectors group by group; generating a specified number of codewords by training an extracted group of residual vectors using an LBG algorithm; forming, by the specified number of codewords generated, a sub-codebook corresponding to the extracted group of residual vectors; setting an index for each codeword in the sub-codebook; setting a group number of the extracted group of residual vectors as an index of the sub-codebook; setting the moduli range of the extracted group of residual vectors as the moduli range of the sub-codebook, where a sub-codebook is formed for each group similarly; and sending each sub-codebook and the moduli range of the each sub-codebook to the codeword search module 103. Accordingly, the codeword search module 103 may be further configured for: receiving and storing each sub-codebook and the moduli range of the each sub-codebook sent by the codebook design module 102.

The LBG algorithm and the method for training moduli of residual vectors using the LBG algorithm are known and are not repeated here.

A specified number of codewords is a number of codewords in a sub-codebook set as needed. The number of codewords in each sub-codebook may be set according to a number of codewords included in a compression codebook generated with existing technology, i.e., as a proportion of the total number of codewords in the compression codebook. For example, when there are three sub-codebooks, numbers of codewords in the three sub-codebooks are set respectively to be ⅛, ¼ and ½ of the total number of codewords in the compression codebook generated with existing technology.

The codebook design module 102 may be further configured for: when sending each sub-codebook and the moduli range of the each sub-codebook to the codeword search module 103, sending the control module 104 a notification of completion of codebook design. The control module 104 may be further configured for: receiving the notification of the completion of codebook design sent by the codebook design module 102, and entering an operation state of obtaining a codeword of optimal match using a sub-codebook.

The control module 104 may be further configured for: after entering the operation state of obtaining a codeword of optimal match using a sub-codebook, determining in real time, as needed, whether sub-codebook re-presetting is needed; when sub-codebook re-presetting is needed, returning to the operation state of sub-codebook generation, or when sub-codebook re-presetting is not needed, staying in the current operation state.

The control module 104 may be further configured for: when the device is in the operation state of obtaining a codeword of optimal match using a sub-codebook, sending the 3D image data to be compressed to the residual vector calculating module 101, and sending the residual vector calculating module 101 a notification to send a calculated to-be-compressed residual vector of a vertex in the 3D image data to be compressed to the codeword search module 103. The residual vector calculating module 101 may be further configured for: calculating the to-be-compressed residual vector of a vertex in the 3D image data to be compressed sent by the control module 104, and sending any calculated to-be-compressed residual vector to the codeword search module 103 according to the notification of the control module 104.

The codeword search module 103 may be specifically configured for: searching a sub-codebook corresponding to a to-be-compressed residual vector of a vertex in 3D image data to be compressed, for a codeword of optimal match of the to-be-compressed residual vector; taking an index of the codeword of optimal match and an index of the sub-codebook where the codeword of optimal match is located as compressed data of the vertex; repeating the search step until compressed data of all vertices in the 3D image data to be compressed are obtained. The sub-codebook corresponding to a to-be-compressed residual vector is determined as one corresponding to a group of residual vectors, where the modulus of the to-be-compressed residual vector falls into the moduli range of the group of residual vectors.

The control module 104 may be further configured for selecting a codeword search method of a Full Search method or a quick search method, and sending the codeword search module 103 a notification of a selected codeword search method. The codeword search module 103 may be further configured for receiving the notification of the selected codeword search method sent by the control module 104.

The codeword search module 103 may be specifically configured for: when the quick search method is selected, calculating, using a PCA algorithm, an orthogonal transformation matrix of a sub-codebook sent by the codebook design module 102; performing an orthogonal transformation on each codeword in the sub-codebook using the orthogonal transformation matrix of the sub-codebook; storing the codeword subject to the orthogonal transformation as a new codeword in the sub-codebook; in codeword search, determining a group of residual vectors of which a modulus of a to-be-compressed residual vector falls into a moduli range, and determining a sub-codebook corresponding to the determined group of residual vectors as the sub-codebook corresponding to the to-be-compressed residual vector; performing orthogonal transformation on the to-be-compressed residual vector using an orthogonal transformation matrix of the sub-codebook corresponding to the to-be-compressed residual vector; and searching codewords subject to orthogonal transformation in the sub-codebook for a codeword of optimal match of the transformed to-be-compressed residual vector. Here, codewords subject to orthogonal transformation in a selected sub-codebook may be searched using an Orthonormal Transform Nearest Neighbor Search (OTNNS) algorithm.

The device for compressing vertex data in 3D image data may be a logic module installed on a mobile terminal or a personal computer.

Figure 2:
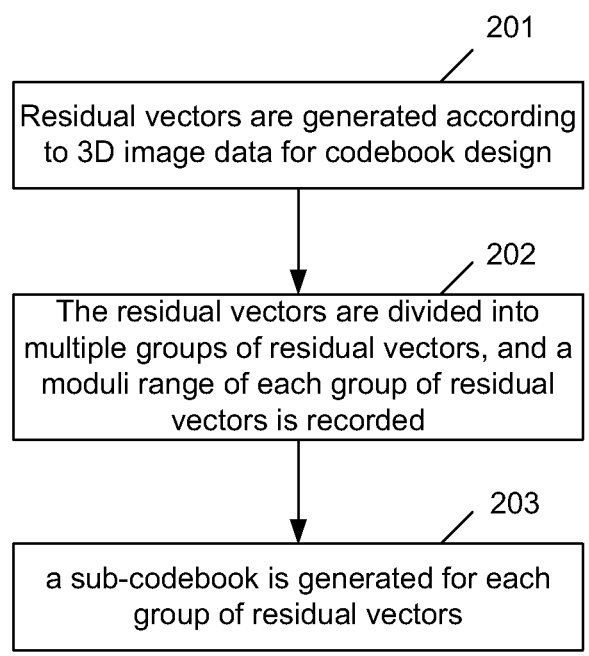
FIG. 2 is a flowchart of sub-codebook generation according to the disclosure.

The disclosure provides a method for compressing vertex data in 3D image data, including two parts of: sub-codebook generation and obtaining a codeword of optimal match using a sub-codebook. As shown in FIG. 2, a sub-codebook generation flow includes steps as follows.

In step 201, residual vectors are generated according to 3D image data for codebook design.

Here, the residual vectors are generated by calculating a residual vector of each vertex in the 3D image data for codebook design using a parallelogram prediction algorithm. The parallelogram prediction algorithm and calculation using the parallelogram prediction algorithm are known technology and are not repeated here. The number of the residual vectors equals that of the vertices in the inputted 3D image data.

In step 202, the residual vectors are divided into multiple groups of residual vectors, and a moduli range of each group of residual vectors is recorded.

Specifically, the received residual vectors of the vertices in the 3D image data for codebook design are sorted in an ascending order of moduli of the received residual vectors; a number of residual vectors are consecutively extracted from the sorted residual vectors to form a group of residual vectors according to grouping proportions and a group number preset; a moduli range of the formed group of residual vectors is recorded; a number (which is equal to the group number) of groups of residual vectors are obtained by repeating the extraction step; and each of the obtained groups of residual vectors is numbered in an order in which the groups of residual vectors are obtained.

In step 203, a sub-codebook is generated for each group of residual vectors.

A sub-codebook is generated for each group of residual vectors by: extracting the groups of residual vectors group by group; generating a specified number of codewords by training an extracted group of residual vectors using an LBG algorithm; forming, by the specified number of codewords generated, a sub-codebook corresponding to the extracted group of residual vectors; setting an index for each codeword in the sub-codebook; setting a group number of the extracted group of residual vectors as an index of the sub-codebook; setting the moduli range of the extracted group of residual vectors as the moduli range of the sub-codebook. A sub-codebook is formed for each group similarly.

After Step 203, it may be determined, as needed, whether sub-codebook re-presetting is needed. If sub-codebook re-presetting is needed, new 3D image data dedicated for sub-codebook generation are selected, and then Step 201 is executed. If sub-codebook re-presetting is not needed, no action is taken.

Figure 3:
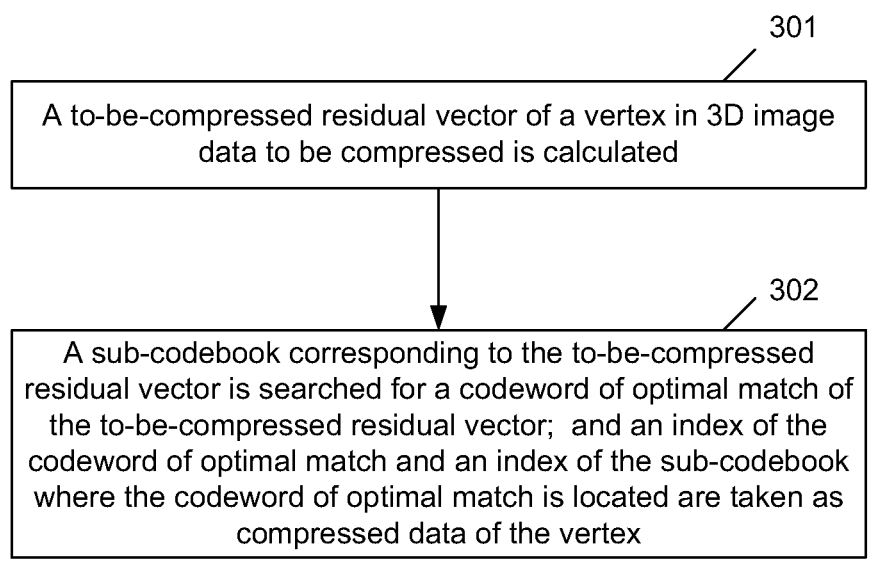
FIG. 3 is a flowchart of obtaining a codeword of optimal match using a sub-codebook according to the disclosure.

After the sub-codebook generation completes, a flow of obtaining a codeword of optimal match using a sub-codebook, as shown in FIG. 3, includes steps as follows.

In step 301, a to-be-compressed residual vector of a vertex in 3D image data to be compressed is calculated.

Here, the calculation may be carried out using the parallelogram prediction algorithm, which is existing technology and is not repeated.

In step 302, a sub-codebook corresponding to the to-be-compressed residual vector is searched for a codeword of optimal match of the to-be-compressed residual vector; and an index of the codeword of optimal match and an index of the sub-codebook, where the codeword of optimal match is located, are taken as compressed data of the vertex until until compressed data of all vertices in the 3D image data to be compressed are obtained.

After Step 302, it may be determined whether new 3D image data to be compressed are received. If new 3D image data to be compressed are received, Step 301 is executed. If no new 3D image data to be compressed is received, the flow continues by repeating determination of whether new 3D image data to be compressed are received.

In addition, in Step 302, a codeword search method may be the existing FS method or a quick search method.

When the quick search method is used, after Step 203 is completed, an orthogonal transformation matrix of a sub-codebook is calculated using a PCA algorithm; an orthogonal transformation is performed on each codeword in the sub-codebook using the orthogonal transformation matrix of the sub-codebook; and the codeword subject to the orthogonal transformation is stored as a new codeword in the sub-codebook; and when the codeword search in Step 302 is carried out, a group of residual vectors of which a modulus of a to-be-compressed residual vector falls into a moduli range is determined, and a sub-codebook corresponding to the determined group of residual vectors is determined as the sub-codebook corresponding to the to-be-compressed residual vector; orthogonal transformation is performed on the to-be-compressed residual vector using an orthogonal transformation matrix of the determined sub-codebook; and a codeword of optimal match of the to-be-compressed residual vector is obtained by searching codewords subject to orthogonal transformation in the determined sub-codebook for a codeword of optimal match of the transformed to-be-compressed residual vector. Here, codewords subject to orthogonal transformation in a selected sub-codebook may be searched using an existing OTNNS algorithm which is not repeated.

In Embodiment 1, assuming that residual vectors are divided into three groups, with respective grouping proportions of 85%, 10% and 5% and a codeword search method of a FS method, a method for compressing vertex data in 3D image data according to the disclosure includes steps as follows.

In step 401, residual vectors are generated using 3D image data dedicated for sub-codebook generation.

In step 402, the residual vectors are divided into three groups, and a moduli range of each group of residual vectors is recorded.

Specifically, the (set of) residual vectors are sorted in an ascending order of moduli of the residual vectors; a number of residual vectors are consecutively extracted from the sorted residual vectors to form a group (or subset) of residual vectors according to the grouping proportions 85%, 10% and 5%; and the moduli range of each group of residual vectors is recorded.

In step 403, three corresponding sub-codebooks are generated respectively using the three groups of residual vectors generated in the last step.

In step 404, a to-be-compressed residual vector of a vertex in the 3D image data to be compressed is calculated.

In step 405, a sub-codebook corresponding to a to-be-compressed residual vector is searched for a codeword of optimal match of the to-be-compressed residual vector;

an index i of the codeword of optimal match and an index u of the sub-codebook are taken as compressed data (u, i) of the vertex; search is performed for each to-be-compressed residual vector similarly until compressed data of all vertices in the 3D image data to be compressed are obtained.

In step 406, it is determined whether new 3D image data to be compressed are received; when new 3D image data to be compressed are received, Step 404 is executed, or when no new 3D image data to be compressed are received, Step 406 is repeated.

In Embodiment 2, assuming that residual vectors are divided into three groups, with respective grouping proportions of 85%, 10% and 5% and a codeword search method of a quick search method, a method for compressing vertex data in 3D image data according to the disclosure includes steps as follows.

In step 501, residual vectors are generated using 3D image data dedicated for sub-codebook generation.

In step 502, the residual vectors are divided into three groups, and a moduli range of each group of residual vectors is recorded.

Specifically, the (set of) residual vectors are sorted in an ascending order of moduli of the residual vectors; a number of residual vectors are consecutively extracted from the sorted residual vectors to form a group (or subset) of residual vectors according to the grouping proportions 85%, 10% and 5%; and the moduli range of each group of residual vectors is recorded.

In step 503, three corresponding sub-codebooks are generated respectively using the three groups of residual vectors generated in the last step.

In step 504, an orthogonal transformation matrix of a sub-codebook is calculated using a PCA algorithm; an orthogonal transformation is performed on each codeword in the sub-codebook using the orthogonal transformation matrix of the sub-codebook; and the codeword subject to the orthogonal transformation is stored as a new codeword in the sub-codebook.

In step 505, a to-be-compressed residual vector of a vertex in the 3D image data to be compressed is calculated.

In step 506, a group of residual vectors of which a modulus of a to-be-compressed residual vector falls into a moduli range is determined, and a sub-codebook corresponding to the determined group of residual vectors is determined as the sub-codebook corresponding to the to-be-compressed residual vector; orthogonal transformation is performed on the to-be-compressed residual vector using an orthogonal transformation matrix of the determined sub-codebook; and a codeword of optimal match of the to-be-compressed residual vector is obtained by searching, using an OTNNS algorithm, codewords subject to orthogonal transformation in the determined sub-codebook for a codeword of optimal match of the transformed to-be-compressed residual vector; an index i of the codeword of optimal match and an index u of the sub-codebook are taken as compressed data (u, i) of the vertex; search is performed for each to-be-compressed residual vector similarly until compressed data of all vertices in the 3D image data to be compressed are obtained.

In step 507:, it is determined whether new 3D image data to be compressed are received; when new 3D image data to be compressed are received, Step 505 is executed, or when no new 3D image data to be compressed are received, Step 507 is repeated.

With the method and device for compressing vertex data in 3D image data according to the disclosure, residual vectors for generating a compression codebook are divided into groups of residual vectors; for each group, a sub-codebook corresponding to the group of residual vectors is generated; a number of codewords in each sub-codebook is specified; fewer codewords is specified for a sub-codebook corresponding to a group of residual vectors with smaller moduli, reducing a total number of codewords in the compression codebook without affecting final compressed data, thereby saving codeword storage space; by increasing a number of codewords for representing residual vectors with larger moduli, quality in encoding is improved; in addition, in codeword search, time spent searching a frequently used sub-codebook may be reduced, thereby improving compression efficiency; a compression ratio of vertex data can be improved by reducing a number of bits of final compressed data.

Further, in codeword search in the disclosure, a quick search method may also be selected to further reduce search time by reducing multiplication operations, thereby further improving the compression efficiency.

The above are only embodiments of the disclosure, and are not intended to limit the scope of protection of the disclosure.

The invention claimed is:

1. A device for compressing vertex data in three-dimensional (3D) image data, comprising a codebook design module and a codeword search module, wherein
the codebook design module is configured for: grouping residual vectors of vertices in 3D image data for codebook design; generating, for each group of residual vectors, a sub-codebook formed by a specified number of codewords; and sending the generated sub-codebook corresponding to a group of residual vectors to the codeword search module; and
the codeword search module is configured for: receiving a sub-codebook sent by the codebook design module; searching for a codeword of optimal match of a to-be-compressed residual vector of a vertex in 3D image data to be compressed; and taking an index of the codeword of optimal match and an index of a sub-codebook where the codeword of optimal match is located as compressed data of the vertex.

2. The device according to claim 1, further comprising a residual vector calculating module configured for calculating residual vectors of vertices in the 3D image data for codebook design, and sending the calculated residual vectors to the codebook design module,
wherein the codebook design module is configured for: receiving the residual vectors of the vertices in the 3D image data for codebook design sent by the residual vector calculating module; sorting the received residual vectors in an ascending order of moduli of the received residual vectors; consecutively extracting a number of residual vectors from the sorted residual vectors to form a group of residual vectors according to a group number and grouping proportions; recording a moduli range of the formed group of residual vectors; obtaining a number (which is equal to the group number) of groups of residual vectors by repeating the extraction step; and numbering each of the obtained groups of residual vectors in an order in which the groups of residual vectors are obtained.

3. The device according to claim 2, wherein
the codebook design module is configured for: extracting the groups of residual vectors group by group; generating a specified number of codewords by training an extracted group of residual vectors using an LBG algorithm; and forming, by the specified number of codewords generated, a sub-codebook corresponding to the extracted group of residual vectors.

4. The device according to claim 3, wherein
the residual vector calculating module is further configured for calculating a to-be-compressed residual vector of a vertex in the 3D image data to be compressed, and sending the calculated to-be-compressed residual vector to the codeword search module; and
the codeword search module is configured for: receiving a to-be-compressed residual vector of a vertex in the 3D image data to be compressed sent by the residual vector calculating module; determining a group of residual vectors of which a modulus of the received to-be-compressed residual vector falls into the moduli range; and searching a sub-codebook corresponding to the determined group of residual vectors for a codeword of optimal match of the received to-be-compressed residual vector.

5. The device according to claim 1, further comprising a control module configured for selecting a codeword search method of a Full Search (FS) method or a quick search method, and sending the codeword search module a notification of a selected codeword search method,
wherein the codeword search module is further configured for receiving the notification of the selected codeword search method sent by the control module.

6. The device according to claim 5, wherein the codeword search module is configured for: when the quick search method is selected,
calculating an orthogonal transformation matrix of a sub-codebook using a Principal Component Analysis (PCA) algorithm; performing an orthogonal transformation on each codeword in the sub-codebook using the orthogonal transformation matrix of the sub-codebook; and storing the codeword subject to the orthogonal transformation as a new codeword in the sub-codebook; and in codeword search, determining a group of residual vectors of which a modulus of a to-be-compressed residual vector falls into a moduli range, and determining a sub-codebook corresponding to the determined group of residual vectors and the to-be-compressed residual vector; performing orthogonal transformation on the to-be-compressed residual vector using an orthogonal transformation matrix of the determined sub-codebook; and searching codewords subject to orthogonal transformation in the determined sub-codebook for a codeword of optimal match of the transformed to-be-compressed residual vector.

7. A method for compressing vertex data in three-dimensional (3D) image data, comprising steps of:

grouping residual vectors of vertices in 3D image data for codebook design; and generating, for each group of residual vectors, a sub-codebook formed by a specified number of codewords; and searching for a codeword of optimal match of a to-be-compressed residual vector of a vertex in 3D image data to be compressed; and taking an index of the codeword of optimal match and an index of a sub-codebook where the codeword of optimal match is located as compressed data of the vertex.

8. The method according to claim 7, wherein the step of grouping residual vectors of vertices in 3D image data for codebook design comprises:

calculating residual vectors of vertices in the 3D image data for codebook design; and sorting the calculated residual vectors of the vertices in the 3D image data for codebook design in an ascending order of moduli; consecutively extracting a number of residual vectors from the sorted residual vectors to form a group of residual vectors according to a group number and grouping proportions; recording a moduli range of the formed group of residual vectors; obtaining a number (which is equal to the group number) of groups of residual vectors by repeating the extraction step; and numbering each of the obtained groups of residual vectors in an order in which the groups of residual vectors are obtained.

9. The method according to claim 7, wherein the step of generating, for each group of residual vectors, a sub-codebook formed by a specified number of codewords comprises:

extracting groups of residual vectors group by group; generating a specified number of codewords by training an extracted group of residual vectors using an LBG algorithm; and forming, by the specified number of codewords generated, a sub-codebook corresponding to the extracted group of residual vectors.

10. The method according to claim 7, wherein the step of searching for a codeword of optimal match of a to-be-compressed residual vector of a vertex in 3D image data to be compressed comprises:

calculating the to-be-compressed residual vector of the vertex in the 3D image data to be compressed; and determining a group of residual vectors of which a modulus of the to-be-compressed residual vector falls into a moduli range; and searching a sub-codebook corresponding to the determined group of residual vectors for a codeword of optimal match of the to-be-compressed residual vector.

11. The method according to claim 10, wherein the sub-codebook corresponding to the determined group of residual vectors is searched for the codeword of optimal match using a Full Search (FS) method or a quick search method.

12. The method according to claim 11, wherein when the quick search method is used, the step of searching a sub-codebook corresponding to the determined group of residual vectors for a codeword of optimal match comprises:

calculating an orthogonal transformation matrix of a sub-codebook using a Principal Component Analysis (PCA) algorithm; performing an orthogonal transformation on each codeword in the sub-codebook using the orthogonal transformation matrix of the sub-codebook; and storing the codeword subject to the orthogonal transformation as a new codeword in the sub-codebook; and in codeword search, determining the group of residual vectors of which the modulus of the to-be-compressed residual vector falls into the moduli range, and determining the sub-codebook corresponding to the determined group of residual vectors and the to-be-compressed residual vector; performing orthogonal transformation on the to-be-compressed residual vector using an orthogonal transformation matrix of the determined sub-codebook; and searching codewords subject to orthogonal transformation in the determined sub-codebook for a codeword of optimal match of the transformed to-be-compressed residual vector.

* * * * *